United States Patent [19]
Schneider et al.

[11] 4,184,860
[45] Jan. 22, 1980

[54] PROCESS FOR THE PRODUCTION OF GLASS FIBER LIGHT CONDUCTORS

[75] Inventors: Hartmut Schneider; Egon Lebetzki, both of Munich, Fed. Rep. of Germany

[73] Assignee: Siemens Aktiengesellschaft, Berlin & Munich, Fed. Rep. of Germany

[21] Appl. No.: 907,012

[22] Filed: May 18, 1978

[30] Foreign Application Priority Data

Jun. 15, 1977 [DE] Fed. Rep. of Germany ....... 2727054

[51] Int. Cl.$^2$ .............................................. C03B 37/00
[52] U.S. Cl. ..................... 65/3 A; 65/30 E; 65/33; 350/96.30; 427/167
[58] Field of Search ............... 65/3 A, DIG. 7, 30 E, 65/33; 350/96.30; 427/167

[56] References Cited

U.S. PATENT DOCUMENTS

| | | | |
|---|---|---|---|
| 3,589,878 | 6/1971 | Achener | 65/3 A |
| 3,884,550 | 5/1975 | Maurer et al. | 65/3 A X |
| 3,899,313 | 8/1975 | Grabmaier et al. | 65/3 A |
| 4,002,512 | 1/1977 | Lim | 65/3 A X |

*Primary Examiner*—Robert L. Lindsay, Jr.
*Attorney, Agent, or Firm*—Hill, Van Santen, Steadman, Chiara & Simpson

[57] ABSTRACT

A process for producing a glass fiber light conductor which has increased tensile strength characterized by forming a protective layer at an elevated temperature either on a preform of the fiber and cladding or on the cladding of a drawn fiber with the material of the protective layer having a coefficient of thermal expansion, which is lower than the adjoining glass material of the fiber so that on cooling from the elevated temperature, the layer is subjected to compressive stresses to increase the tensile strength of the fiber.

9 Claims, No Drawings

PROCESS FOR THE PRODUCTION OF GLASS FIBER LIGHT CONDUCTORS

BACKGROUND OF THE INVENTION

1. Field of the Invention

The present invention is directed to a process of producing glass fiber light conductors.

2. Prior Art

Normally glass fiber light conductors, which have a low attenuating effect, consist of a cylindrical quartz glass core having an index of refraction $n_K$, which core is surrounded by a quartz glass casing or cladding having an index of refraction $n_M$, where $n_M$ is smaller or less than $n_K$. The desired difference of the index of refraction can be set by utilizing different amounts of doping material in the core glass and the cladding glass, which doping materials are suitable oxides. Light conducting fibers of this type are generally produced in accordance with a chemical vapor deposition process (a CVD method), for example, by depositing the oxides from a gas phase in a glass tube which is subsequently collapsed.

Although these glass fiber light conductors have outstanding light transmittancy, their practical use is limited by their low tensile strength. Under special conditions in a vacuum, a high tensile strength can, in fact, be measured on the quartz glass fiber. Glass fiber light conductors, which are exposed to the atmosphere, rapidly loose their tensile strength when handled. The supposition is that the fiber breakage is due to irregular, mechanical damage to the surface of the fiber.

In order to increase the tensile strength, the glass fiber light conductor is provided with a thin layer of synthetic material immediately following the drawing process of the fiber. This provides a conductor with a certain protection against environmental influences such as corrosion, mechanical damage due to contact and, therefore, improves the stability of the fiber. Before a light conductor of this type can be used in practice, it must be joined in a cable to enable it to withstand the tensile forces which will occur when a cable is installed. The speed and costs involved in a process of forming a cable are basically dependent upon the stability of the light conductor fiber.

SUMMARY OF THE INVENTION

The present invention is directed to providing a process for the production of a glass fiber light conductor which has an increased tensile strength.

To accomplish these aims or tasks, the present invention is directed to an improvement in a process for the production of a glass fiber light conductor having a core with a surrounding cladding. The process includes providing a preform having a core of the material for the core of the glass fiber surrounded with material forming a cladding thereof, heating the fiber preform to a temperature for drawing the preform into a glass fiber and then drawing the preform into the glass fiber with the improvement comprising applying to the cladding material at an elevated temperature at least one protective layer consisting of a glass material which has a coefficient of thermal expansion lower than the coefficient of thermal expansion of the adjoining glass material of the cladding so that when the drawn fiber with the protective layer is at room temperature, the protective layer will be subjected to compressive stresses and the tensile strength of the fiber will be increased. The application of the protective layer can be either directly on the preform prior to the drawing step or can be on the drawn fiber. The tensile strength is achieved in that during the cooling of the fiber and the protective layer following the drawing of the preform into the fiber or following the application of the protective layer to the fiber, which process will also involve heating, compressive stresses occur in the protective layer. These compressive stresses counteract any tensile stresses occurring during the general handling and in particular during the installation of the light conductive fiber.

The protective layer serves to increase the average stability of the fiber and to reduce the distribution width of the probability of breakage. When using a glass fiber light conductor, which consists of a glass core which is surrounded by a cladding or casing selected of a sufficiently large optically active casing or cladding material, it is advantageous for the index of refraction of the protective layer to be selected to be higher than the index of refraction of the casing or cladding material. This provides the possibility of selecting a glass protective layer having favorable values of specific physical properties such as, for example, thermal expansion, elasticity, tensile strength, viscosity, surface tension and micro-hardness irrespectively of the optical properties of the fibers. In the event the protective layer is already applied to the fiber preform, it is advantageous for the protective layer to consist of a glass material which has a lower viscosity than the glass material of the fiber which adjoins the protective layer.

If the adjoining glass material consists of quartz glass (silicon dioxide) or a glass which has a melting point of a similar level to the melting point of quartz glass in other words a glass similar to quartz glass, it is particularly advantageous for the protective layer to consist of a glass having a base of silicon dioxide, which is doped with one or several oxides of chemical elements selected from a group consisting of lithium, sodium, magnesium, calcium, boron, aluminum, lanthanum, germanium, tin, lead, titanium, zirconium, phosphorous, niobium and tantalum. Preferably, a mixture of silicon dioxide and titanium dioxide is used for the protective layer because this glass has mechanical properties similar to those of quartz glass, but is characterized by a particularly low coefficient of thermal expansion. With an increasing control of titanium dioxide, the coefficient of thermal expansion decreases. However, when the mixture contains approximately 11 weight percent titanium dioxide, a phase separation can occasionally take place in the glass and this phase separation leads to a higher coefficient of thermal expansion.

If the optically active glass of the glass fiber light conductor is produced in accordance with a process which initially produces a rod-like or tubular preform or workpiece, for example, in a chemical vapor deposition process, it is expedient to provide the preform with the protective layer. Here it is advantageous for the protective layer to be applied to the fiber preform by employing a flame hydrolysis. The protective layer may be formed of one or more glass forming elements in the form of oxides and the flame hydrolysis decomposes the gasoues compounds of the glass forming elements into the glass forming oxides. If the gaseous compounds of the glass forming elements of the protective layer are not available, solutions of salts of the elements and/or metal organic compounds of the elements in a solution are provided and atomized with the atomized solutions being mixed with the flame gases of a burner to be deposited on the fiber preform beside the flame as oxides which are subsequently heated with the flame to form the protective layer.

In the event that the protective layer decomposes at the high temperatures prevailing in the fiber drawing furnace, it is advantageous for the protective layer to be applied to the fiber in accordance with the liquid phase deposition process, for example, a process disclosed in U.S. Pat. No. 3,759,683.

In any case, it is advantageous for the protective layer to be applied to the fiber preform or to the fiber by a chemical vapor deposition process.

An advantageous further development of the process as described above consists in that prior to the application of the protective layer, the cladding of the fiber preform or the fiber itself is provided with an intermediate layer, which consists of a glass material having a higher coefficient of thermal expansion than the cladding material. This further development produces a particularly high compressive stress in the subsequently applied protective layer.

Advantageously, in this further development, a partially separated and/or crystallized glass is used for the protective layer or the intermediate layer. This provides the advantageous possibility of favorably influencing the coefficient of thermal expansion of the relevant layer by a temperature treatment.

DESCRIPTION OF THE PREFERRED EMBODIMENTS

The principles of the present invention are particularly useful in a process of forming or producing a glass fiber light conductor. The following is an exemplary example of the improvement in the process of the present invention in which a fiber preform receives a protective layer utilizing a flame hydrolysis.

Initially a rod-like fiber preform is produced by a chemical vapor deposition process of depositing an internal coating in a glass tube and then subsequently collapsing the internally coated tube. Here a quartz glass is used for the glass tube and silicon dioxide-germanium dioxide glass is used for the inner coating. The dimensions are selected to be such that following the collapse of the tube to form the preform, the glass rod or preform has a silicon dioxide-germanium dioxide glass core with a diameter of approximately 6 mm and has a quartz glass casing or cladding which has an outer diameter of approximately 12 mm. Since the preform is produced by collapsing of an internally coated tube and thus was automatically flame polished, the glass rod has a surface which is subjected to low disturbances.

This rod or preform is then clamped horizontally in a turning lathe and rotated about its axis. The rod is coated with a protective layer by utilizing an oxyhydrogen flame or a burner, which is positioned at a distance of approximately 3 cm below the rotating rod. An excess of oxygen in the burner produces oxidizing conditions in the flame. The overall oxygen flow through the burner amounts to 1300 Nml/min with 100 Nml/min being passed through a vaporizer vessel, which is filled with silicon tetrachloride at a temperature of 30° C. and another 200 Nml/min being passed through a vessel containing titanium tetrachloride which is heated to 57° C. The chlorides transported by the gas flow are oxidized in the flame to form oxides which are deposited on the rod and form a white, porous oxide layer. To enable the rod or preform to be uniformly coated, the burner is moved along the rod. The first burner is preferably accompanied by a laterally offset second burner which will melt the oxide layer deposited by the first burner at a higher temperature so that it will be a clear, bubble-free glass. At a burner speed of 20 cm/min, eighty layers are melted onto the preform and will result in a preform obtaining a glass layer of approximately 0.4 mm as the protective layer. This glass layer consists of silicon dioxide-titanium dioxide glass, which contains at approximately 6 weight percent titanium dioxide.

In order to avoid obstructions of the burner nozzle due to titanium tetrachloride being prematurely reacted to form a solid material in the nozzle, it is advantageous to use a burner wherein the flame is lifted or boosted from the burner by an additional gas flow. An example of additional gas flow is a flow of nitrogen, which emerges from a second nozzle.

The glass rod, which has been provided in this way with the protective layer is then drawn in a fiber drawing machine at a normal drawing temperature of approximately 2000° C. to form the fiber. The furnace atmosphere must contain a high proportion of oxygen so that the silicon dioxide-titanium dioxide glass layer will not tend to decompose to form low grade color titanium oxides. Advantageously, the drawing is carried out in a pure oxygen atmosphere.

When the probability of breakage of the glass fiber produced in this way is determined, there is both an increase in the average tensile strength and a reduction of the distribution width of the probsbility of breakage in comparison to fibers without a protective layer.

As a result of the increase in the titanium dioxide concentration and the result of the optimization of the concentration profile and the thickness of the protective layer, the tensile strength is also further improved. In order to additionally increase the stability of the fiber following the drawing process and winding of the fiber, a synthetic layer is applied in a normal manner to form an outer layer.

The compressive stresses in the protective layer can be further increased in accordance with a further embodiment of the process. In the further embodiment, prior to the application of the protective layer, such as onto the fiber preform, an intermediate layer is applied to the cladding of the preform or to the fiber. The intermediate layer consists of a glass material having a higher coefficient of thermal expansion than the coefficient of thermal expansion for the material of the cladding layer. For example, the stress in the titanium dioxide-silicon dioxide protective layer can be increased by means of utilizing a silicon dioxide, germanium dioxide intermediate layer, which has a higher coefficient of thermal expansion that the quartz glass of the cladding layer.

The intermediate layer can also be produced by applying a silicon dioxide, titanium dioxide layer, which has a higher titanium dioxide content. This is then coated with the silicon dioxide titanium dioxide layer having a lower titanium dioxide concentration. Here the $TiO_2$ concentrations are selected to be such that during the following tempering, which can be carried out as soon as the outer protective layers was applied, the intermediate layer is devitrified and partially crystallized, although the outer layer will remain clear. As a result of the devitrification and recrystallization, the coefficient of thermal expansion of the intermediate layer increases and becomes greater than that of quartz glass. Typical concentration values for the titanium oxide $TiO_2$ are, for example, 15 weight percent for the intermediate layer and 8 weight percent for the protective layer. One of the advantages of this process consists in the fact that the intermediate layer is prevented from cracking or moving out of position, which may occur in a production method involving temperature fluctuations.

Although various minor modifications may be suggested by those versed in the art, it should be understood that we wish to embody within the scope of the patent warranted hereon, all such modifications as reasonably and properly come within the scope of our contribution to the art.

We claim:

1. In a process for the production of glass fiber light conductors having a core with a surrounding cladding, the process including providing a preform having a core of the material for the core of the glass fiber surrounded with a glass material forming a cladding thereof, heating the fiber preform to a temperature for drawing the preform into a glass fiber, and then drawing the preform into a glass fiber, the improvement comprising applying an intermediate layer to the cladding material, said intermediate layer consisting of a glass material having a coefficient of thermal expansion higher than the coefficient of thermal expansion of the cladding material, and then applying to the intermediate layer at an elevated temperature at least one protective layer consisting of a glass material, which has a coefficient of thermal expansion lower than the coefficient of thermal expansion of the adjoining glass material of the intermediate layer so that when the drawn fiber with the protective layer is at room temperature, the protective layer will be subjected to compressive stresses and the tensile strength of the fiber will be increased.

2. In a process according to claim 1, wherein the protective layer is a glass material which has a lower viscosity than the glass material immediately adjoining the protective layer.

3. In a process according to claim 1, wherein the protective layer is a glass having a base of silicon dioxide being doped with at least one oxide of an element selected from a group consisting of lithium, sodium, magnesium, calcium, boron, aluminum, lanthanum, germanium, tin, lead, titanium, zirconium, phosphorous, niobium and tantalum.

4. In a process according to claim 1, wherein the step of applying the protective layer involves employing flame hydrolysis.

5. In a process according to claim 4, wherein the protective layer is formed of more than one oxide of glass forming elements and said flame hydrolysis decomposes gaseous compounds of the glass forming elements into said glass forming oxides.

6. In a process according to claim 4, wherein the protective layer is formed of oxides of glass forming elements and said process includes providing solutions of salts of element and metal-organic compounds of the elements in a solvent, atomizing said solutions and mixing the atomized solutions with the flame gases of a burner to be deposited on a fiber as oxides beside the flame and subsequently heating the oxides to form the protective layer.

7. In a process according to claim 1, wherein the step of applying the protective layer utilizes a liquid phase deposition process.

8. In a process according to claim 1, wherein the step of applying the protective layer utilizes a chemical vapor deposition process.

9. In a process according to claim 1, wherein the material used for the protective layer and the intermediate layer includes partially separated and crystallized glasses.

* * * * *